United States Patent [19]

Katagiri et al.

[11] 3,934,717

[45] Jan. 27, 1976

[54] FLAT-ARTICLE ORIENTING APPARATUS FOR AN AUTOMATIC MAIL HANDLING SYSTEM OR THE LIKE

[75] Inventors: Takeo Katagiri; Shinichi Fujiwara, both of Tokyo, Japan

[73] Assignee: Nippon Electric Company Limited, Tokyo, Japan

[22] Filed: Mar. 25, 1974

[21] Appl. No.: 454,496

[30] Foreign Application Priority Data

Mar. 26, 1973 Japan ................................ 48-35461

[52] U.S. Cl. ................................ 198/282; 271/185

[51] Int. Cl.² ........................................ B65G 47/24

[58] Field of Search .................... 198/282, 283, 284; 209/DIG. 1, 116; 271/184, 185, 186

[56] References Cited

UNITED STATES PATENTS

| | | | |
|---|---|---|---|
| 1,445,899 | 2/1923 | McGregor | 198/282 |
| 2,805,753 | 9/1957 | Palmer | 198/282 X |
| 3,128,868 | 4/1964 | Bowen | 198/282 |

FOREIGN PATENTS OR APPLICATIONS

| | | | |
|---|---|---|---|
| 226,148 | 2/1963 | Austria | 271/185 |

*Primary Examiner*—Richard A. Schacher

*Attorney, Agent, or Firm*—Sughrue, Rothwell, Mion, Zinn & Macpeak

[57] ABSTRACT

Apparatus for orienting flat articles having straight edges such that a long edge of the article is brought into or retained in contact with the bottom surface of a transport path. The apparatus comprises an upwardly open, U-shaped transport path and at least one member disposed above the U-shaped transport path by a predetermined distance and having a surface in a plane generally perpendicular to the bottom of the U-shaped transport path and oriented at an acute angle to the flow of flat articles in the U-shaped transport path. In the preferred embodiment, the bottom of the U-shaped transport path is an upwardly inclined conveyor, and a plurality of the members are positioned along the U-shaped transport path at angles which alternate in sense.

9 Claims, 6 Drawing Figures

FLAT-ARTICLE ORIENTING APPARATUS FOR AN AUTOMATIC MAIL HANDLING SYSTEM OR THE LIKE

This invention relates to a flat-article orienting apparatus for an automatic mail handling system or the like.

In a mail handling system, such flat articles as cards, envelopes, and postcards must be oriented in a longitudinal direction thereof so that a long edge of the flat article is laid on a transport means, such as a conveyor belt. Additionally, mail culling apparatus is designed to segregate the flat articles of widths exceeding a predetermined width after the orientation thereof is completed.

For this purpose, various kinds of flat-article orienting apparatuses have been proposed. In the conventional apparatuses, however, mechanically processable flat articles having widths smaller than a predetermined width with their short edges lying on the conveyor belt are fed together with flat articles of widths exceeding the predetermined width to the segregator in the mail culling apparatus. In that arrangement, not only the larger-width articles but also the smaller-width ones tend to be segregated.

It is an object of this invention, therefore, to provide an improved flat-article orienting apparatus in which flat articles of a variety of sizes and conditions may be oriented in a longitudinal direction.

According to this invention, there is provided an improved flat-article orienting apparatus comprising (1) a U-shaped transport path having at least one conveyor belt for transporting flat articles and (2) an elastic member positioned above the U-shaped transport path. The conveyor belt and the elastic member should be made of materials satisfying a relationship such that the coefficient of friction between the flat article and the elastic member is greater than that between the flat articles themselves and is smaller than that between the flat article and the conveyor belt.

The features and advantages of this invention will be better understood from the following detailed description of a preferred embodiment of this invention taken in conjunction with the accompanying drawings, wherein.

Figure 1:
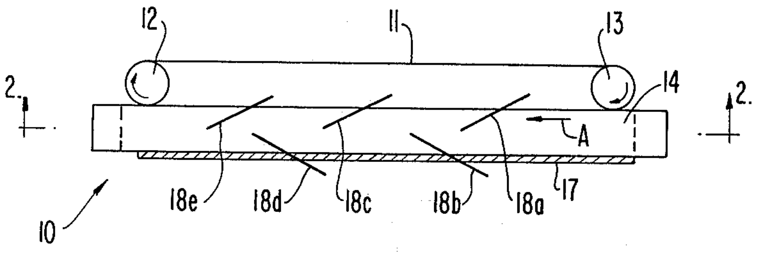
FIG. 1 is a plan view of an embodiment of this invention.
Figure 2:
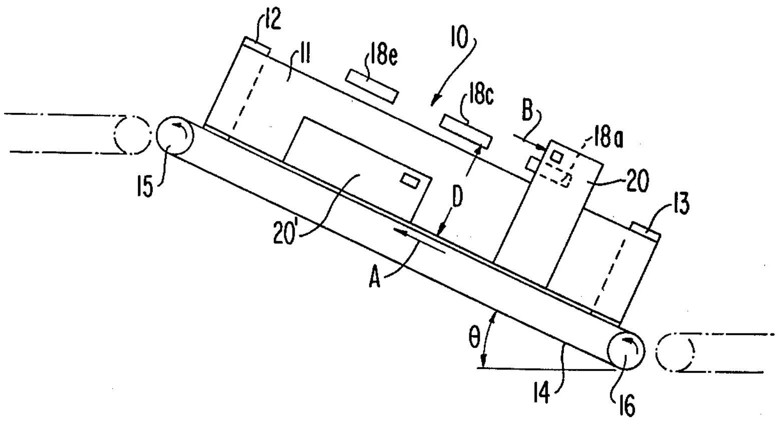
FIG. 2 is a cross-sectional view of the embodiment taken along the line 2—2 on FIG. 1.

Referring to FIGS. 1 and 2, the presently preferred embodiment of this invention comprises: an inclined U-shaped transport path 10 composed of a first conveyor belt 11 supported on rollers 12 and 13, a second conveyor belt 14 supported on rollers 15 and 16 for transporting the flat articles in a direction of the arrows A, a side plate 17, and a plurality of elastic members 18*a*, 18*b*, 18*c*, 18*d*, and 18*e* positioned above the U-shaped transport path 10 and oriented with respect to the longitudinal direction of the conveyor 11 and 14 in such a manner that the individual imaginary extended portions thereof in the direction of the arrows A are in intersection with the adjacent elastic member. In other words, the sense of the acute angle between the contact surfaces of the elastic members 18*a*–18*e* and the flow of the flat articles alternates between positive and negative. The distance D between the upper surface of the second conveyor belt 14 and the lower side of the elastic members 18*a*–18*e* is determined depending on the width of the widest flat article mechanically processable in the system. The distance between the conveyor belt 11 and the side plate 17 is such that the flat articles to be oriented by the apparatus are kept on their edges — or, in other words, with their planar surfaces generally parallel to the sides of the U-shaped transport path. The second conveyor belt 14 and the elastic members 18*a*–18*e* should be made of materials satisfying the relationship that the coefficient of friction $k_1$ between the flat articles and the elastic members 18*a*–18*e* is greater than the coefficient of friction $k_2$ between the flat articles themselves and is less than the coefficient of friction $k_3$ between the flat articles and the second conveyor belt 14. That is, $$k_3 > k_1 > k_2.$$

More fundamentally, the desired relationship is:

$$F_3 = k_3 gp > F_1 = k_1 f_1 > F_2 = k_2 f_2$$

wherein $k_1$, $k_2$, and $k_3$ are as defined above and $F_3$ = the friction force between the flat articles and the conveyor belt 14

$F_1$ = the friction force between the flat articles and the elastic members 18*a*–18*e*

$F_2$ = the friction force between the flat articles themselves $gp$ = the component of the force of gravity perpendicular to the conveyor belt 14

$f_1$ = the force with which the flat articles are pushed against the elastic members 18*a*–18*e*

$f_2$ = the force with which the flat articles are pushed against each other

However, the first relationship given above represents an entirely satisfactory approximation for the second, and one which is much easier to work with. In the case of a mail handling system, the elastic members 18*a*–18*e* may be rubber plates.

A flat article 20 on the second conveyor belt 14 inclined by an angle $\theta$ has a gravity component in a direction B opposite to the direction A. The flat article 20 is transported in the direction A by the conveyor belt 14 due to a frictional force between the flat article 20 and the conveyor belt 14 which is applied to the lower portion thereof in the direction A. Furthermore, because the flat article 20 is in a standing state in which the short edge thereof is laid on the conveyor belt 14, the center of gravity thereof is in its upper portion. Thus, the posture of the flat article 20 is unstable.

Under the circumstances, when the flat article 20 comes in contact with the first elastic member 18*a*, a frictional force is produced between the flat article 20 and the elastic member 18*a*. That frictional force is applied to the upper portion of the flat article 20 in the direction B. Therefore, the flat article 20 is easily brought down so that the long edge of the flat article 20 is laid on the conveyor belt 14. In other words, the flat article 20 is oriented in a longitudinal direction. Thus, the flat-article orienting is achieved by the elastic member.

The orientation of the overlapped articles will be described below referring to FIGS. 3 through 6.

Figure 3:
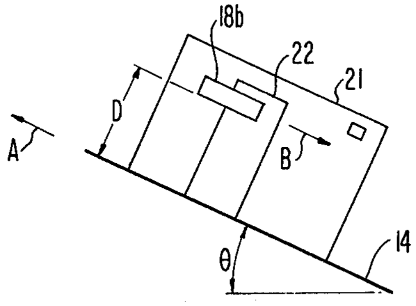
FIG. 3 through 6 illustrate various modes of operation of the embodiment.
Figure 4:
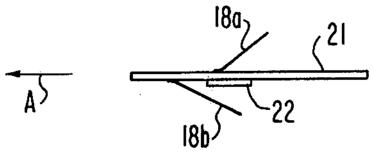

Referring to FIGS. 3 through 6, flat articles 21 and 22 on the second conveyor belt 14 overlap each other. The flat article 21 has a wider width than the distance D and is lying on a long edge. The flat article 22 has a length shorter than the width of the flat article 21 and longer than the distance D and is lying on a short edge. Furthermore, the flat article 22 is fully convered by the flat article 21, as shown in FIG. 3.

The overlapped flat articles 21 and 22 are transported in the direction A by the conveyor belt 14, and the flat article 21 comes in contact in turn with the elastic members 18*a*, 18*b*, 18*c* .... . Although the frictional forces between the flat article 21 and the elastic members are applied to the flat article 21, the flat article 21 is transported through the elastic members while continuing to be on its long edge, because its center of gravity is not in its upper portion, and the coefficient $k_3$ between the flat article and the conveyor belt 14 is greater than the coefficient $k_1$ between the flat article and the elastic member.

Figure 5:
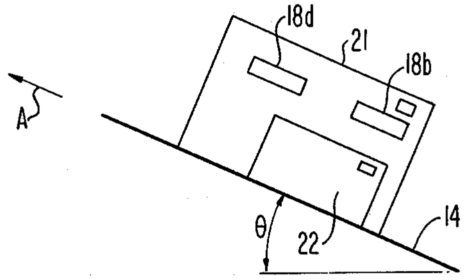
Figure 6:
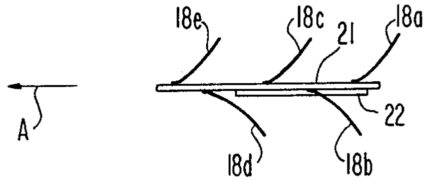

On the other hand, the flat article 22 does not come in contact with the first elastic member 18*a* because the flat article 22 comes behind the flat articles 21. However, it does come into contact with the second elastic member 18*b*. (See FIG. 4). Because the coefficient of friction $k_2$between the flat articles is less than the coefficient of friction $k_1$ between the flat article and the elastic members, the differential frictional force is applied in the direction B to the flat article 22, which is lying on its short edge. Therefore, as shown in FIG. 5, the flat article 22 is brought down to the conveyor belt 14 in the same manner as described above. Thus, the flat article 22 is oriented in a longitudinal direction, and transported in the direction A by the conveyor belt 14 while not coming in contact with the following elastic members.

In the above embodiment of this invention, a plurality of elastic members are installed so that an individual imaginary portion of the elastic member extended in the direction of motion of the flat articles intersects the next elastic member. Therefore, even if the standing flat articles are on either side or on both sides of the wide flat article 21, the orientation of the flat articles will be completed.

The effect of the orientation is increased with the inclination angle $\theta$ of the U-shaped transport path. The maximum value of the angle $\theta$ depends upon the coefficients of friction between the flat article, the conveyor belt, and the elastic member, i.e., the materials of the conveyor belt and the elastic member.

Furthermore, it is obvious to those skilled in the art that the orientation of the flat articles is possible by using the horizontally installed U-shaped transport path, i.e., it is possible to make the angle $\theta$ zero.

What is claimed is:

1. Apparatus for orienting flat articles having straight edges such that a long edge of the article is brought into or retained in contact with the bottom surface of a transport path, said apparatus comprising:

a. an upwardly open, U-shaped transport path adapted to retain flat articles having straight edges and coefficients of friction of $k_2$ relative to each other in an orientation such that their planar surfaces are generally parallel to the sides of said U-shaped transport path, the bottom of said U-shaped transport path being made of a material having a coefficient of friction of $k_3$ with respect to the flat articles which are to be oriented by the apparatus, and b. at least one member disposed above said U-shaped transport path by a predetermined distance and having a surface in a plane generally perpendicular to the bottom of said U-shaped transport path and oriented at an acute angle to the flow of flat articles in said U-shaped transport path, the said surface of said member being made of a material having a coefficient of friction of $k_1$ with respect to the flat articles which are to be oriented by the apparatus, the coefficient of friction $k_1$ being smaller than the coefficient of friction $k_3$ but larger than the coefficient of friction $k_2$.

2. Apparatus as claimed in claim 1 wherein the bottom of said U-shaped transport path is a conveyor belt.

3. Apparatus as claimed in claim 2 wherein at least one side of said U-shaped transport is a conveyor belt.

4. Apparatus as claimed in claim 1 wherein said U-shaped transport path is inclined to the horizontal when in use.

5. Apparatus as clamed in claim 4 wheren said U-shaped transport path is, when in use, inclined upwardly in the direction of motion of the flat articles which are to be oriented by the apparatus.

6. Apparatus as claimed in claim 1 and comprising a plurality of said members mutually oriented such that the individual imaginary extended portions of each member except the last member in the direction of motion of the flat articles which are to be oriented by the apparatus intersect the adjacent member.

7. Apparatus as claimed in claim 1 and comprising a plurality of said members, the sense of the acute angle made by the said surfaces of said members alternating between positive and negative.

8. Apparatus as claimed in claim 1 wherein the said surface of said member is made of an elastic material.

9. Apparatus as claimed in claim 8 wherein the said surface of said member is made of rubber.

* * * * *